2684 X
J. B. Robinson,
Horse Power,
Patented Oct. 14, 1816.
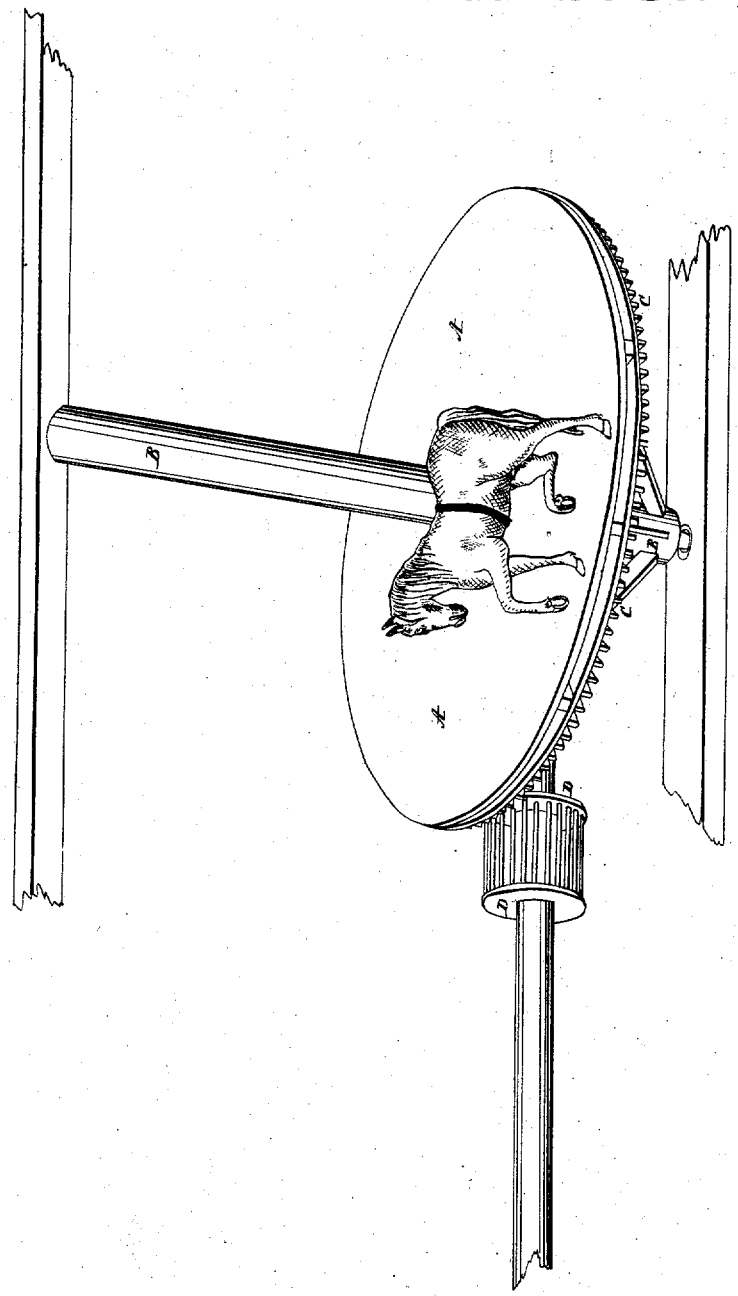
AM. PHOTO-LITHO. CO. N.Y. (OSBORNE'S PROCESS)

Oct 14 1816 2684X

To all to whom these presents shall come, Greeting.

Whereas, that the annexed is a true Copy of the Specification making part of the Patent granted to Joseph Best Robinson for his improvement in the inclined Horse wheel dated the 14th of October 1816.

In testimony whereof, I John Q. Adams Secretary of State of the United States, have [illegible] subscribed my name and caused the Seal of the department of State to be affixed.

Done at the City of Washington this second day of May A.D. 1820

J. Q. Adams

Description of the inclined Horse Wheel (mentioned in the above Petition)

The arms of the inclined Horse wheel pass through a shaft at right angles and [illegible] [illegible] in such a manner as to sustain the weight of one or more horses. The shaft is inclined from a perpendicular about ten degrees which of course elevates one side of the wheel ten degrees above and depresses the other side of the same ten degrees below the horizon. a horse therefore placed behind the extra arms. by his weight carries round the wheel and must of necessity continually walk in order to retain his position. the arms of the wheel may be braced from the shaft either above or below the wheel or both. a cog wheel may be affixed either to the upper side or under side of the arms. or to other arms passing through the shaft either above the Horse walk or below it. Cogs may be affixed ~~either~~ to the upper or under sides or the edges to mash into one or more wallowers so as to proportion the powers & velocity in any manner found most useful. The diameter of the Wheel and length of the shaft may be also increased or diminished to suit the Burthen of Boats. the extent of Mills manufactories &c which may be put in motion by the wheel. on the shaft of the wallower a balance wheel should be affixed especially for Saw Mills whose size and weight may be proportioned to the extent of machinery put in motion (Cincinnati Sept 5th 1816)

Test. Stephen Holbert
Thomas Hughes

Joseph Best Robinson

[illegible]